(12) United States Patent
Gargi

(10) Patent No.: US 8,756,677 B2
(45) Date of Patent: Jun. 17, 2014

(54) VARIABLE-STRENGTH SECURITY BASED ON TIME AND/OR NUMBER OF PARTIAL PASSWORD UNLOCKS

(75) Inventor: Ullas Gargi, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 248 days.

(21) Appl. No.: 13/483,310

(22) Filed: May 30, 2012

(65) Prior Publication Data

US 2013/0326611 A1    Dec. 5, 2013

(51) Int. Cl.
*G06F 21/00* (2013.01)
(52) U.S. Cl.
USPC .................... 726/16; 713/183; 726/5; 726/19
(58) Field of Classification Search
None
See application file for complete search history.

(56) References Cited

U.S. PATENT DOCUMENTS

| | | | |
|---|---|---|---|
| 5,682,475 A * | 10/1997 | Johnson et al. ................. | 726/18 |
| 6,904,526 B1 * | 6/2005 | Hongwei ...................... | 713/182 |
| 7,043,640 B2 * | 5/2006 | Pritchard et al. .............. | 713/184 |
| 7,552,467 B2 * | 6/2009 | Lindsay ............................ | 726/5 |
| 7,581,113 B2 * | 8/2009 | Smith et al. .................... | 713/184 |
| 7,769,889 B2 * | 8/2010 | Weatherford et al. ........ | 709/238 |
| 7,814,203 B2 * | 10/2010 | Weatherford ................. | 709/225 |
| 8,140,854 B2 * | 3/2012 | Ogawa .......................... | 713/183 |
| 8,627,422 B2 * | 1/2014 | Hawkes et al. .................... | 726/5 |
| 2004/0088588 A1 | 5/2004 | Awada et al. | |
| 2005/0154926 A1* | 7/2005 | Harris .......................... | 713/202 |
| 2006/0041759 A1* | 2/2006 | Kaliski et al. ................. | 713/184 |
| 2009/0199264 A1* | 8/2009 | Lang ................................. | 726/1 |
| 2010/0005525 A1 | 1/2010 | Fischer | |
| 2010/0024028 A1 | 1/2010 | Baugher et al. | |
| 2011/0105073 A1 | 5/2011 | Hassan et al. | |
| 2013/0283337 A1* | 10/2013 | Schechter et al. ................ | 726/1 |

OTHER PUBLICATIONS

Thorpe, Julie; van Oorschot, P.C. Towards Secure Design Choices for Implementing Graphical Passwords. 20th Annual Computer Security Applications Conference. Pub. Date: 2004. Relevant pp. 50-60. Found on the World Wide Web at: http://ieeexplore.ieee.org/stamp/stamp.jsp?tp=&arnumber=1377215.*
"Partial Passwords—Theory and a Demo Implementation using PHP and Javascript", HummingBird Designs, www.hbirddesigns.com/~launch/workshops/partial - passwords - theory - and - a - demoimplementation - using - php - and - javascript/ (Apr. 7, 2011).
International Search Report and Written Opinion issued in corresponding PCT Application No. PCT/US13/33955 on Jul. 8, 2013.

* cited by examiner

*Primary Examiner* — Cordelia Zecher
*Assistant Examiner* — Jeremiah Avery
(74) *Attorney, Agent, or Firm* — Morris & Kamlay LLP

(57) ABSTRACT

An authentication scheme for unlocking a computing system may require a shortened password in some cases. For example, the computing system may be configured to determine a time that a user has been locked out of a computing device and to determine which of a plurality of time spans that the time falls within. The computing system may also prompt the user for a required password including a full password or a subset of the full password depending on the determined time span. The computing system may be further configured to display a visual indicator corresponding to the determined time span or a required password length on a visual display. A length of the required password for login may be progressively longer for each of the plurality of time spans as a time period that a respective time span covers increases.

35 Claims, 9 Drawing Sheets

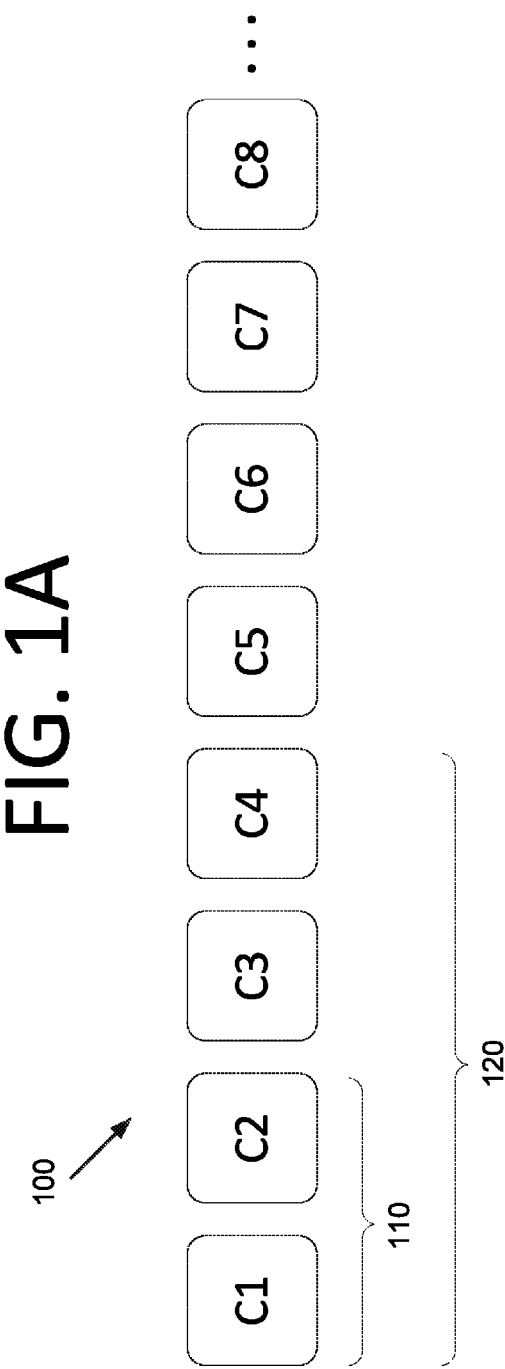
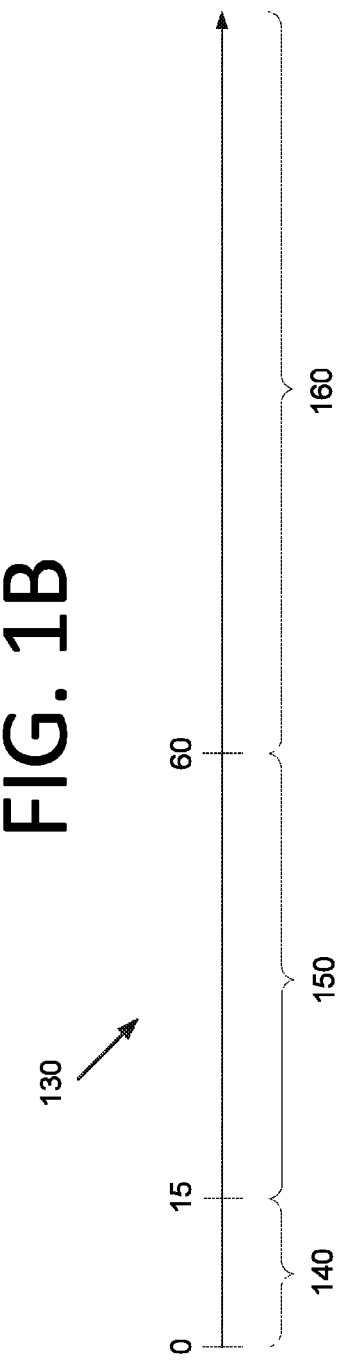

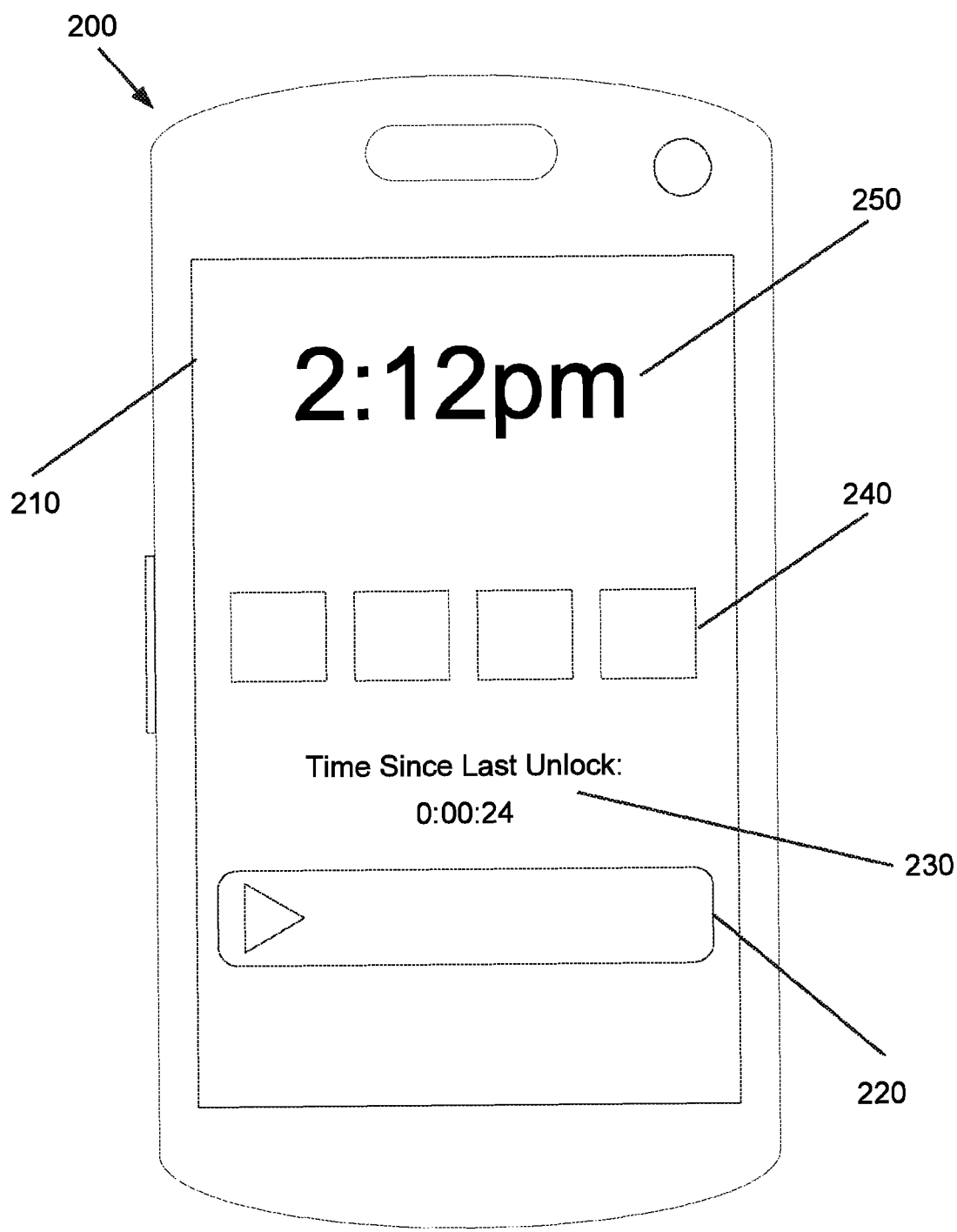

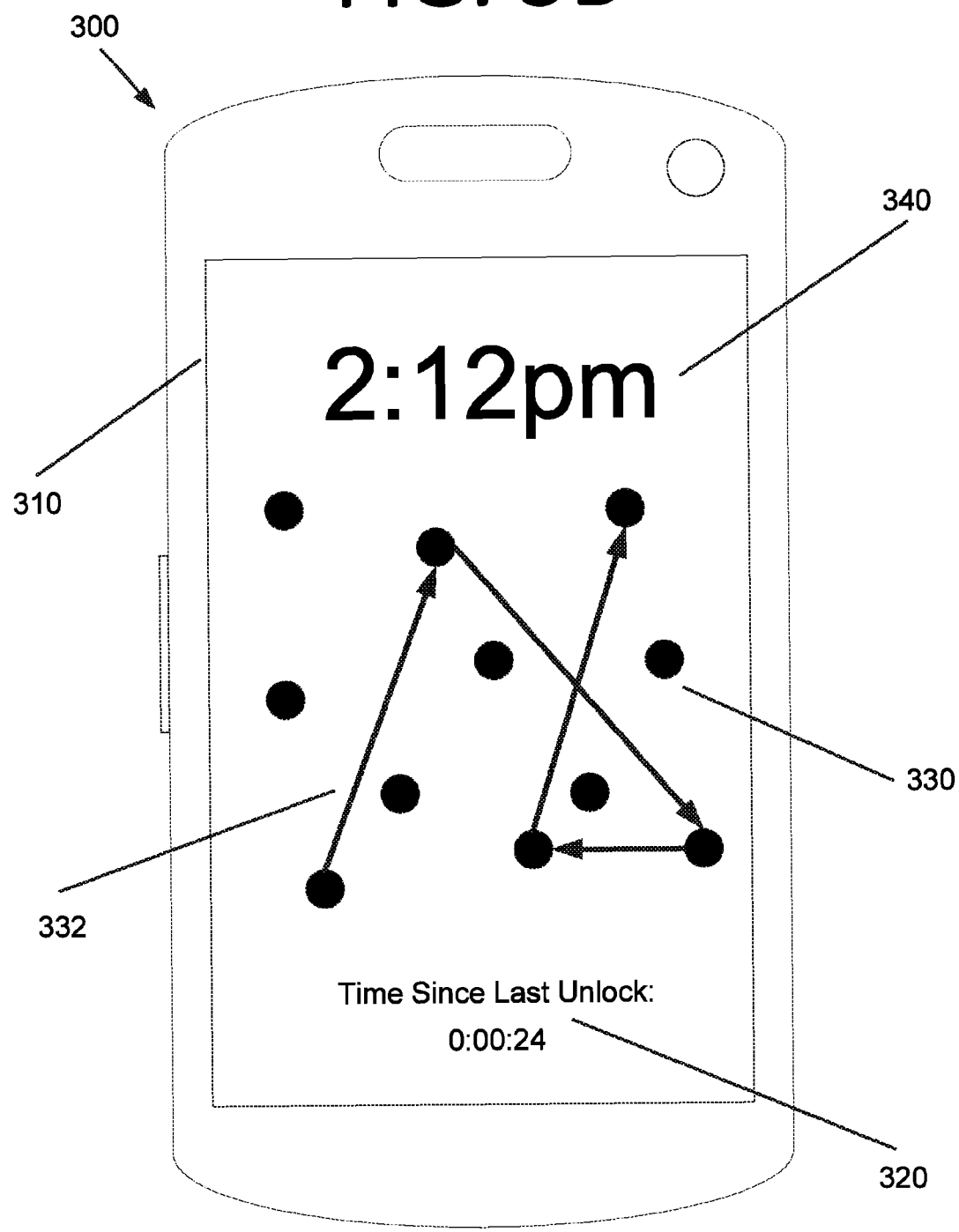

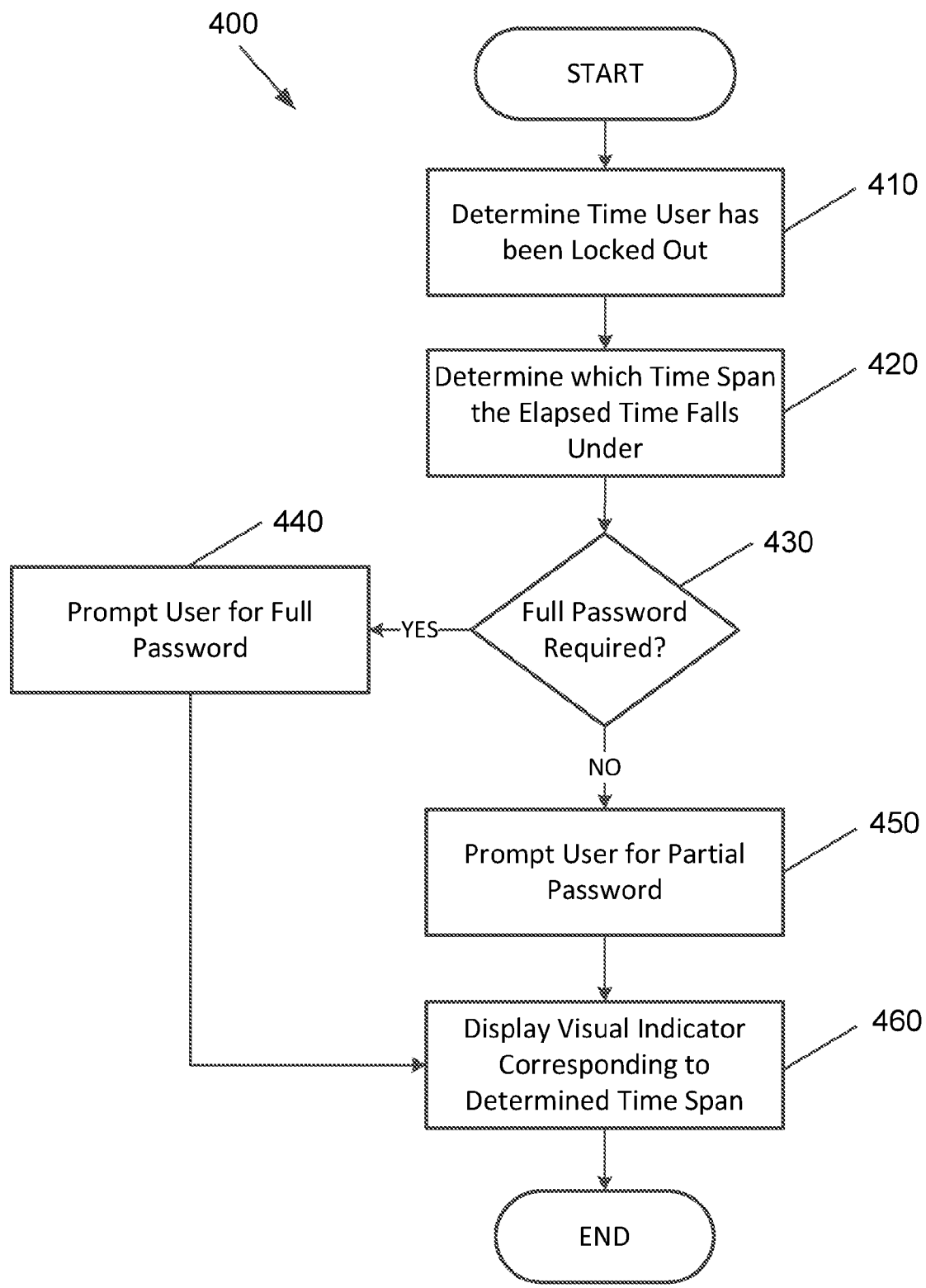

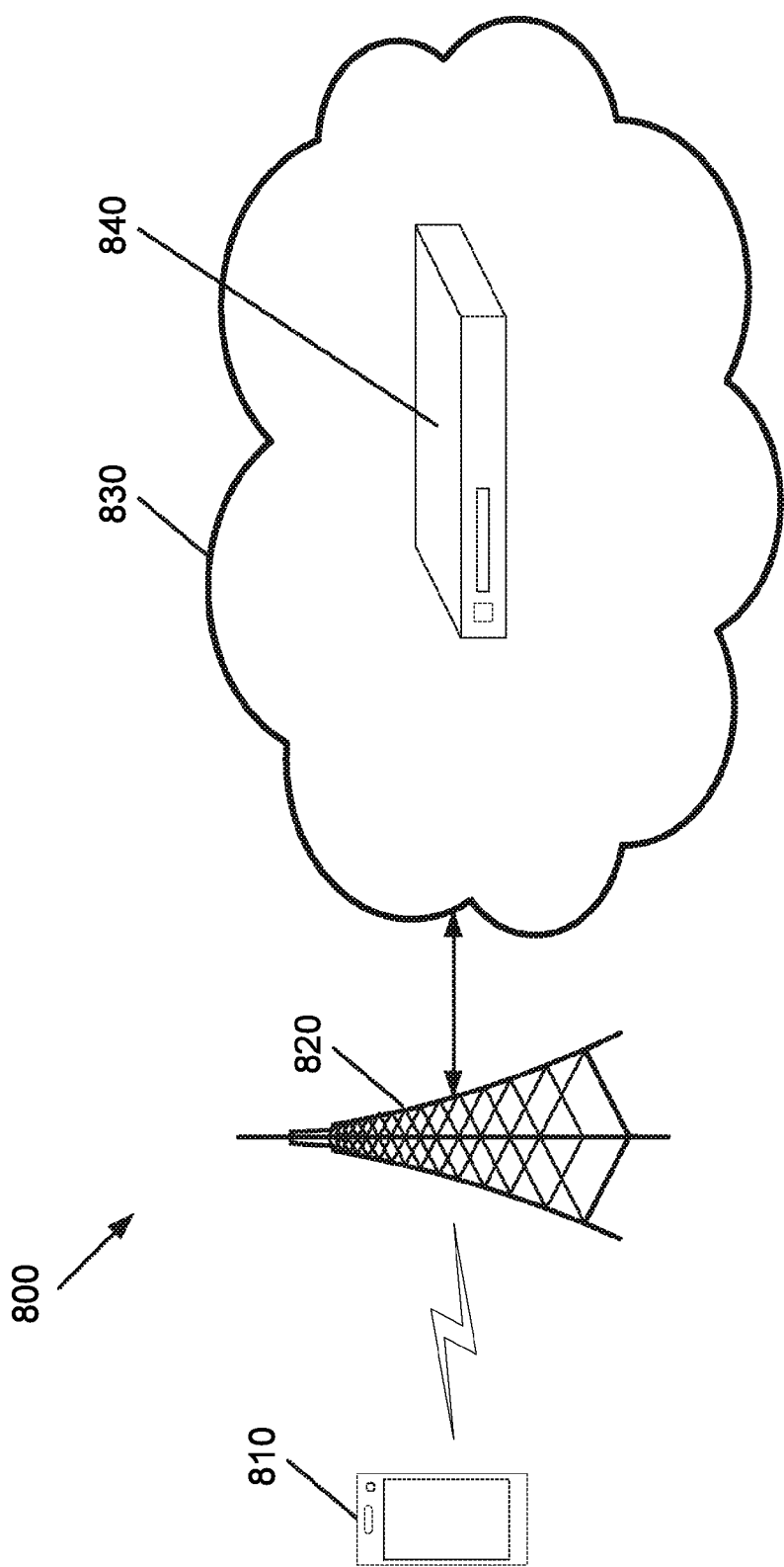

VARIABLE-STRENGTH SECURITY BASED ON TIME AND/OR NUMBER OF PARTIAL PASSWORD UNLOCKS

FIELD

The present disclosure generally pertains to security, and more specifically, to variable-strength security for a computing system based on a time that the computing system has been in a locked state and/or a number of partial password unlocks.

BACKGROUND

Computing systems such as mobile telephones, laptop and tablet computers, and desktop computers may enter a locked state when not in use. The locked state may occur when a user has been away for a predetermined amount of time, or when a user manually controls the computing system to enter the locked state, for example. In order to unlock and use the computing system, the user generally must enter a full password.

Such computing systems are often used many times throughout the day, and a single period of use may be referred to as a "session". Individual sessions may vary in length. Sessions may be relatively long (e.g., reading and responding to email), generally having relatively long breaks between sessions. Sessions may also be relatively short (e.g., quick checks of weather, sports scores, or a calendar), often occurring in rapid succession. For example, a user may check a calendar, re-check the calendar, send a quick instant or text message, check a sports score, and recheck a sports score within a matter of a few minutes.

Both long and short sessions typically require the same amount of authentication—namely, entry of a full password. This generally results in either poor security due to short passwords or inconvenience due to long passwords or personal identification numbers for rapid unlocks. Accordingly, an approach to authentication that overcomes these disadvantages may be beneficial.

SUMMARY

Certain implementations of the present disclosure may provide solutions to the problems and needs in the art that have not yet been fully solved by conventional authentication approaches to unlocking computing systems. For example, certain implementations of the present disclosure may require a subset of a full password when a computing system has been in a locked state less than a predetermined amount of time.

In one implementation of the present disclosure, a computer program embodied on a computer-readable storage medium is configured to control a processor to determine a time that a user has been locked out of a computing device and to determine which of a plurality of time spans that the time falls within. The computer program is also configured to control the processor to prompt the user for a required password including a full password or a subset of the full password depending on the determined time span that the time falls within. The computer program is further configured to control the processor to display a visual indicator corresponding to the determined time span or required password length on a visual display. A length of the required password for login is progressively longer for each of the plurality of time spans as a time period that a respective time span covers increases.

In another implementation of the present disclosure, a computer-implemented process includes determining, by a computing system, a number of times that the computing system has been unlocked using at least one subset of a full password. When the number of times is less than a predetermined number, the computer-implemented process also includes requiring, by the computing system, a subset of the full password to unlock the computing system. When the number of times is equal to the predetermined number, the computer-implemented process includes requiring, by the computing system, the full password to unlock the computing system. The computer-implemented process further includes receiving, by the computing system, a password entered by a user, and authenticating the password, by the computing system, to unlock the computing system.

In yet another implementation of the present disclosure, an apparatus includes physical memory including computer program instructions and at least one processor configured to execute the computer program instructions. The at least one processor is configured to determine a time that the apparatus has been in a locked state and determine a requisite length of a required password to unlock the apparatus by dividing the time that the apparatus has been in the locked state by a first predetermined number. The at least one processor is also configured to receive a password entered by a user and authenticate the password to unlock the apparatus.

In still another implementation of the present disclosure, an apparatus includes physical memory including computer program instructions and at least one processor configured to execute the computer program instructions. The at least one processor is configured to determine a number of times that the apparatus has been unlocked using a partial password since a last full password unlock. When the apparatus has been unlocked less than a predetermined number of times using the partial password, the at least one processor is configured to prompt the user for the partial password. When the apparatus has been unlocked the predetermined number of times using the partial password, the at least one processor is configured to prompt the user for the full password. The at least one processor is also configured to receive a password entered by a user and authenticate the password to unlock the apparatus.

BRIEF DESCRIPTION OF THE DRAWINGS

In order that the advantages of certain implementations of the disclosure will be readily understood, a more particular description of the apparatuses, processes, and computer programs briefly described above will be rendered by reference to specific implementations that are illustrated in the appended drawings. While it should be understood that these drawings depict only typical implementations of the apparatuses, processes, and computer programs, and are not therefore to be considered to be limiting of its scope, the apparatuses, processes, and computer programs will be described and explained with additional specificity and detail through the use of the accompanying drawings, in which:

FIG. 1A illustrates an example password and the subsets thereof required for each of a plurality of time spans, according to an implementation of the present disclosure.

FIG. 1B illustrates a timeline for the plurality of time spans associated with the password and subsets of FIG. 1A, according to an implementation of the present disclosure.

FIG. 2 illustrates a mobile computing device in a locked state, according to an implementation of the present disclosure.

FIGS. 3A and 3B illustrate a mobile computing device that is unlocked by drawing ordered line segments between a series of points, or location indications, according to an implementation of the present disclosure.

FIG. 4 is a flowchart illustrating a process for a variable password length security system, according to an implementation of the present disclosure.

FIG. 8 illustrates a telecommunications system, according to an implementation of the present disclosure.

DETAILED DESCRIPTION

Figure 3A:
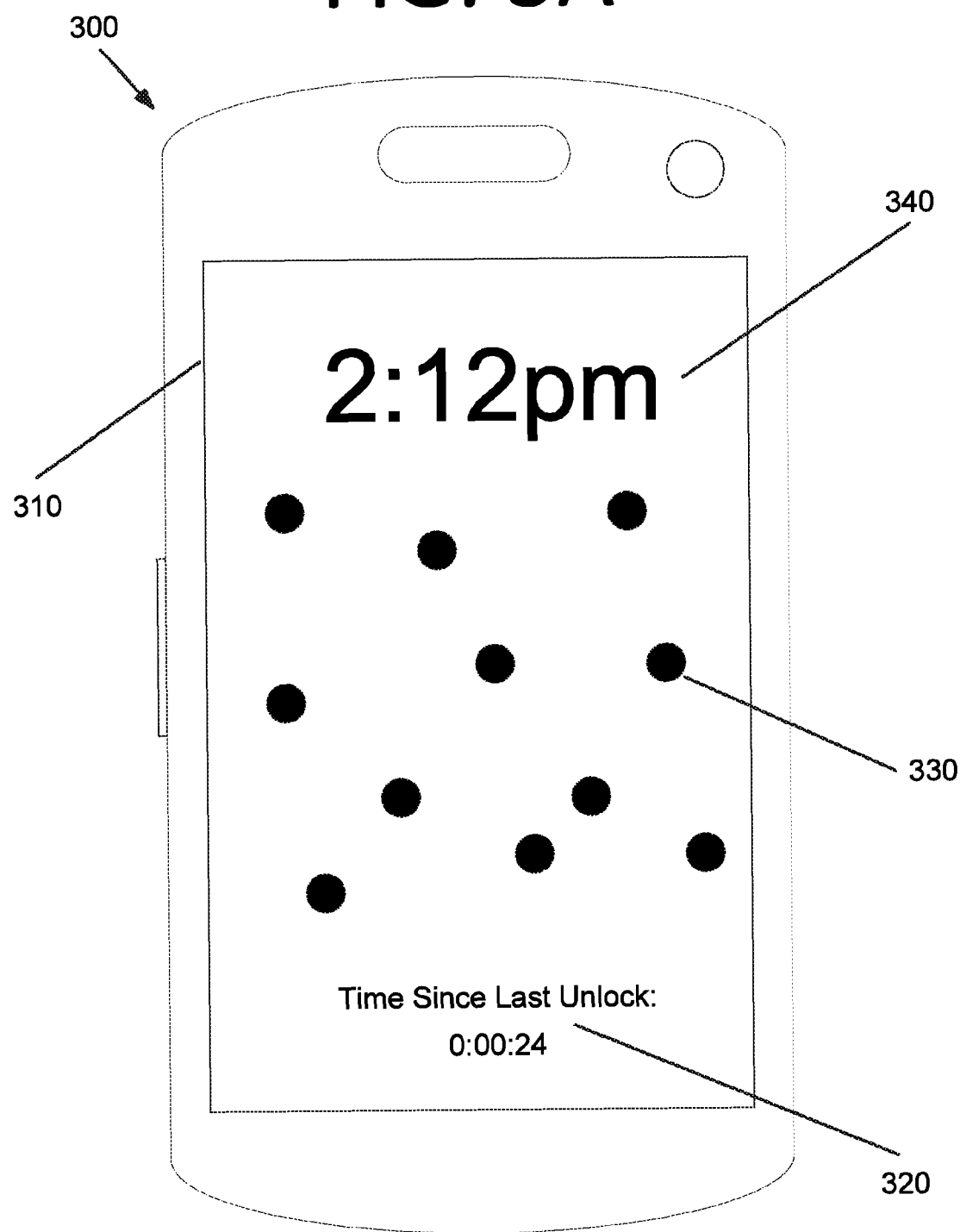

Some implementations of the present disclosure require variable-length subsets of a full password when a computing system has been in a locked state for less than a predetermined amount of time. For example, in some implementations, in a case where a full password is eight digits or more, if the computing system has been locked for 15 seconds or less, only the first two characters of the password may be required. If the computing system has been locked for more than 15 seconds, but less than a minute, the first four characters of the password may be required. If the computing system has been locked for one minute or more, the full password may be required. Thus, in this example, three time spans are used: 0-15 seconds, 15-59 seconds, and 60 or more seconds. These features may make use of a computing system more convenient when a user is unlocking the device relatively frequently.

Generally speaking, when a partial password is required in some implementations, the partial password may be a prefix, a suffix, or any subset in the middle of the full password. The partial password may also have a backwards ordering with respect to the full password. In some implementations, the partial password may be every other character, every third character, etc. of the full password in a forwards of backwards ordering until its full length is reached. In certain implementations, the partial password may only consist of alphanumeric characters of the full password, only non-alphanumeric characters of the full password, only letters, only numbers, etc. The subset to enter may change, and a visual indicator may assist the user in identifying which subset of the full password to enter.

The number of time spans that are used and the length of each time span depend upon the implementation and all variations are fully encompassed within implementations of the present disclosure. Further, the starting position of each partial password depends upon the implementation and all variations are fully encompassed within implementations of the present disclosure. For example, the starting position may be the first character of the password, the fourth character of the password, or be determined as a distance from the end, or any other position, of the password. In other words, a first time span may require the last two characters of the password, the second time span may require the last four characters of the password, etc. The required partial password may also be read forwards or backwards from a reference position in the full password. The required partial password may also be selected types of characters including the full password, such as only the numeric elements, non-alphanumeric elements, and so on, which form a portion of the full password.

A visual display device integrated with or operably connected to the computing system may show a visual indication relating to the time since the last unlock and/or the length of the password that is required. For example, a clock may show how long the user has been gone. A color, a number of character slots, and/or an explicit indication of the number of digits that are required may be shown in addition to, or instead of, the clock.

In some implementations, if the user enters an incorrect partial password a certain number of times, such as once, three times, etc., the full password may be required to unlock the computing system. In certain implementations, if the computing system is within a certain proximity to another electronic device, such as a personal computer, a certain router, etc., a partial password may always be required. In some implementations, the partial password may only unlock certain functionality. For instance, entry of the partial password may only enable a user to access recently used applications within a certain time period, applications used during the last unlock, and/or certain prequalified applications that the user is allowed to access after entering a partial password (such as email, calendar, etc.).

FIG. 1 illustrates an example password 100 and the subsets thereof required for each of a plurality of time spans, according to an implementation of the present disclosure. FIG. 1B illustrates a timeline 130 for the plurality of time spans associated with the password and subsets of FIG. 1A, according to an implementation of the present disclosure. In this implementation, password 100 has at least eight characters C1-C8, and may have more characters, as illustrated by the ellipsis. A "character" may include alphanumeric characters or other suitable symbols available under the American Standard Code for Information Interchange ("ASCII"), Unicode, or any other single language or multi-language standard.

Two subsets 110 and 120 of password 100 are shown in FIG. 1A. Subset 110 includes the first two characters C1 and C2 of password 100 and subset 120 includes the first four characters C1-C4 of password 100. A timeline 130 illustrates the time spans associated with each subset, as well as the full password. Subset 110 is associated with first time span 140, which is between 0 and 15 seconds. Subset 120 is associated with second time span 150, which is more than 15 seconds, but less than 60 seconds. Full password 100 is associated with third time span 160, which is 60 seconds or more. The respective subset or full password may be required for the respective time span within which the time that the computing system has been locked falls. As can be seen, the length of the password that is required becomes progressively longer with each successive time span.

FIG. 2 illustrates a mobile computing device 200 in a locked state, according to an implementation of the present disclosure. In some implementations, mobile computing device 200 may be computing system 700 of FIG. 7. Mobile computing device 200 includes a screen 210 displaying a user interface that makes use of touch-based, or haptic, controls. However, in other implementations, other input devices or combinations of input devices, such as a keyboard and/or a mouse, may be used. A slide bar 220 allows a user to further interact with mobile computing device 200. In some implementations, the user must first use slide bar 220 by moving a finger across its space on screen 210 from left to right in order to enter password text and further interact with mobile computing device 200.

Screen 210 also includes a time since the last unlock 230, a password entry section 240, and a current time 250. In some implementations, a number of entry slots shown in password entry section 240 may correspond with the number of characters of the password that are required. In some implementations, each entry slot may scroll vertically to allow a user to select password characters or, when pressed, may cause a character display section to show on screen 210 that allows the user to select password characters. In certain implementations, a single text entry section may be shown such that the full password or subsets thereof are entered only in that location, and each character does not have an individual box. Further, in order to protect user privacy, the password may only be stored on, and received by, mobile computing device 200 and may not be transmitted to external computing systems in some implementations.

FIGS. 3A and 3B illustrate a mobile computing device 300 that is unlocked by drawing ordered line segments between a series of points, or location indications, according to an implementation of the present disclosure. In some implementations, mobile computing device 300 may be computing system 700 of FIG. 7. Similar to mobile computing device 200 of FIG. 2, mobile computing device 300 has a screen 310, a time since last unlock 320, and a current time 340. However, instead of an area to enter password characters, screen 310 has a series, or constellation, of points or location indications 330. As illustrated in FIG. 3B, a user may draw a series of directional line segments 332, or vectors, to unlock mobile computing device 300. The pattern and direction make up the "password". In certain implementations, the line segments may not be directional and may be drawn beginning from either end of the segment.

FIG. 4 is a flowchart 400 illustrating a process for a variable password length security system, according to an implementation of the present disclosure. In some implementations, the process of FIG. 4 may be implemented, for example, by mobile computing devices 200 and 300 of FIGS. 2 through 3B or computing system 700 of FIG. 7. The process begins with the computing system being in a locked state. A time that a user has been locked out of a computing device is determined at 410. A time span of a plurality of time spans that the time falls within is then determined at 420. For example, the time spans may be less than one minute, one minute to less than five minutes, five minutes to less than fifteen minutes, and fifteen minutes or more. However, any number and length of time spans may be used as a matter of design choice.

Based on the time span in which the elapsed time in the locked state falls, the computing system makes a determination of whether the full password is required at 430, such as when the elapsed time in the locked state has been fifteen minutes or more. If the full password is required, the user is prompted for the full password at 440. If the full password is not required at 430, the user is prompted for a partial password at 450. A visual indicator corresponding to the determined time span or required password length is also displayed at 460. The visual indicator may include, but is not limited to, a number representing the length of the partial password, a color (e.g., green for two characters, yellow for four characters, blue for the full password, etc.), a text representation of the a plurality of entry slots for password characters (e.g., password entry section 240 of FIG. 2), a subset of a full constellation of location indications, such as dots, hollow circles, grids, etc., or any combination thereof. A length of the required password may be indicated by a clock, a number of character slots, a displayed number, etc.

A length of the required password for login is progressively longer for each of the plurality of time spans as a time period that a respective time span covers increases. For example, two characters may be required for less than one minute in a locked state, four characters may be required for one minute to less than five minutes, six characters may be required for five minutes to less than fifteen minutes, and the full password may be required for fifteen minutes or more. When less than a subset of the full password is required, the required password may be a prefix or a suffix of the full password, for example.

A visual indicator of the visual display may change when the user has entered a required number of password characters. Also, a progressively longer subset of the password may be required for each successive unlock until the full password is required. Such a feature may override the length indicated by the time span. For instance, if it has been less than one minute in the above example, and the user is on his or her second unlock since using the full password to unlock the computing system, four characters may be required instead of two to unlock the system. In the alternative, the number of previous unlocks using a subset of the full password may be tracked and the full password may be required once the number of previous unlocks reaches a predetermined number. Any variation of these general concepts is included within the scope of implementations of the present disclosure.

In some implementations, the requisite length of the password may be determined by applying an algorithm that determines the requisite length by incrementing a length by one character for each time span that has passed, up to a length of the full password, for a length of each time span times the length of the full password. In certain implementations, the display may include a series of location indications, and the length of the password may be the number of line segments that the user must draw to unlock the computing system. In some implementations, the system may be unlocked when a last character of the required password to unlock the system is entered.

Figure 5:
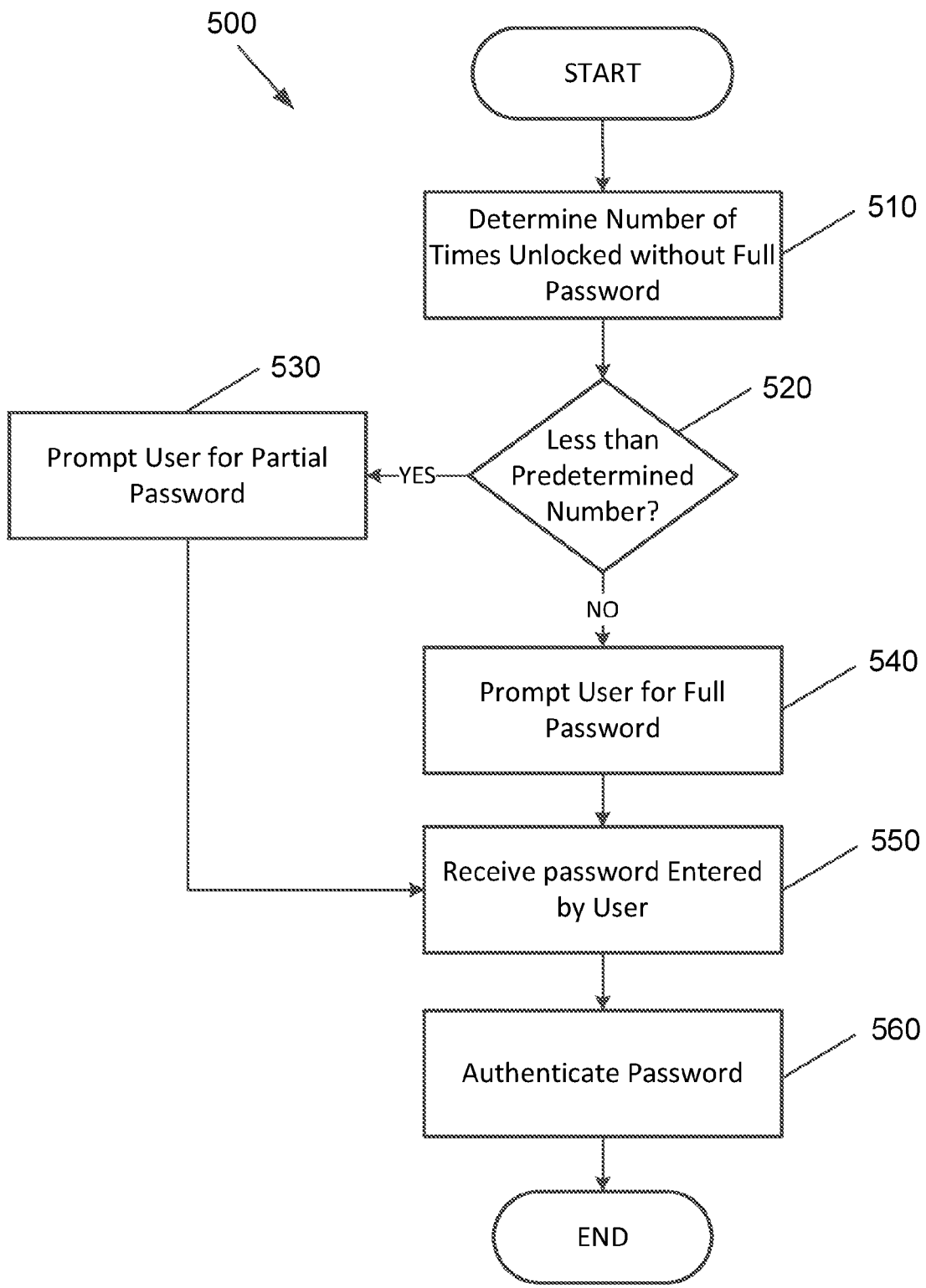
FIG. 5 is a flowchart illustrating another process for a variable password length security system, according to an implementation of the present disclosure.

FIG. 5 is a flowchart 500 illustrating another process for a variable password length security system, according to an implementation of the present disclosure. In some implementations, the process of FIG. 5 may be implemented, for example, by mobile computing devices 200 and 300 of FIGS. 2 through 3B or computing system 700 of FIG. 7. The process begins with the computing system being in a locked state. The computing system determines a number of times that the computing system has been unlocked using at least one subset of a full password at 510.

When the number of times is less than a predetermined number at 520, the computing system requires a subset of the full password for unlock at 530. In some implementations, the length of the required subset may become longer with successive unlocks and/or with elapsed time in a locked state. When the number of times is not less than the predetermined number at 520, the computing system requires the full password for unlock at 540. The computing system then receives the partial or full password entered by a user at 550 and authenticates the password to unlock the computing system at 560.

In some implementations, when a partial password is required, the partial password may be a prefix or a suffix of the full password. In some implementations, a progressively longer partial password may be required for each successive unlock until the full password is required due to length increase or due to reaching the predetermined number of partial password unlocks. The length of the required password may be indicated by a clock, a number of character slots, or a displayed number in certain implementations. Furthermore, a visual indicator of the visual display of the computing system may change when the user has entered a required number of password characters.

In some implementations, the requisite length of the password may be determined by applying an algorithm that determines the requisite length by incrementing a length by one character for each time span that has passed, up to a length of the full password, for a length of each time span times the length of the full password. For example, if the time span is 15 seconds, the password length may be one character for less than 15 seconds, two characters for 15 seconds to less than 30 seconds, three characters for 30 seconds to less than 45 seconds, etc. until the full password is required. In some embodiments, a minimum password length is required regardless of how short the time in the locked state is. For example, a user may be required to enter two characters initially, four characters initially, etc. In certain implementations, the display may include a series of location indications, and the length of the password may be the number of line segments that the user must draw to unlock the computing system. In some implementations, the computing system may be unlocked when a last character of the required password to unlock the computing system is entered. In certain implementations, the full password is required once a predetermined period of time has elapsed, regardless of the number of previous unlocks.

Figure 6:
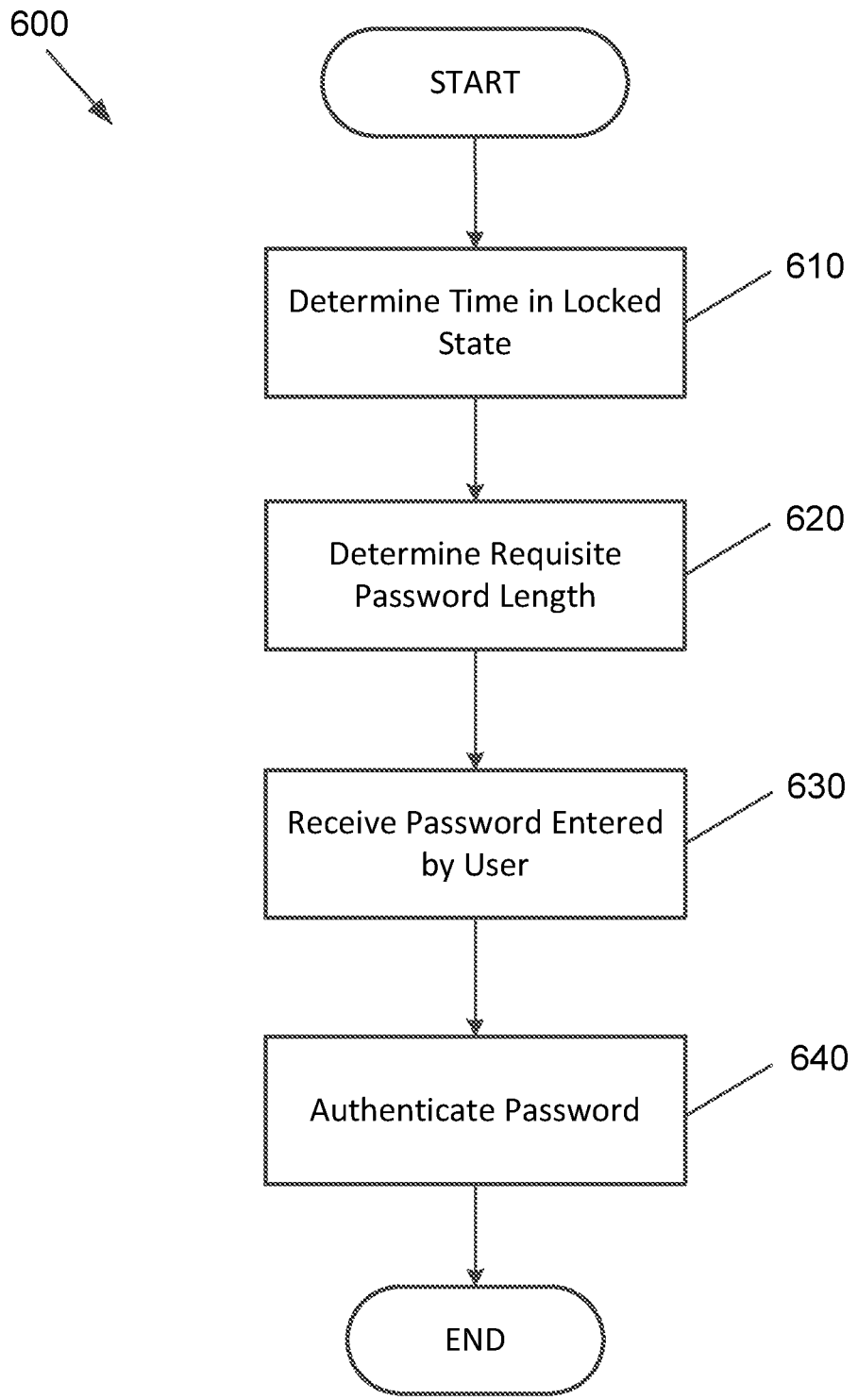
FIG. 6 is a flowchart illustrating yet another process for a variable password length security system, according to an implementation of the present disclosure.

FIG. 6 is a flowchart 600 illustrating yet another process for a variable password length security system, according to an implementation of the present disclosure. In some implementations, the process of FIG. 6 may be implemented, for example, by mobile computing devices 200 and 300 of FIGS. 2 through 3B or computing system 700 of FIG. 7. The process begins with the computing system being in a locked state. The time that the computing system has been in the locked state is determined at 610.

The computing system then determines a requisite length for a required password for unlock by dividing the time that the computing system has been in the locked state by a predetermined number at 620. The predetermined number may correspond with a length of each time span if the time spans are uniform, removing any remainder by rounding down or rounding up. For instance, if each time span is 60 seconds and the elapsed time in the locked state is 200 seconds, then the required password length may be three characters. The computing system then receives a password entered by a user at 630 and authenticates the password to unlock the computing system at 640.

In some implementations, the full password may be required when the time in the locked state divided by the predetermined number exceeds another predetermined number. For instance, if the other predetermined number is 7 and the time in the locked state divided by the predetermined number is 8, then the full password may be required instead of a partial password. In some implementations, when a partial password is required, the partial password may be a prefix or a suffix of the full password.

In certain implementations, the computing system may track a number of previous unlocks using a subset of the full password and require the full password once the number of previous unlocks reaches the predetermined number. In certain implementations, this may be performed instead of time-based tracking rather than supplemental thereto. In some implementations, both the number of times the computing system has been unlocked and the time in the locked state may be tracked and used in combination to determine the partial password length. For instance, consider an implementation where each time the computing system has been unlocked increases the initial partial password length by one and the passage of each time span also increases the partial password length by one. When the computing system has been unlocked twice since the last time the full password was entered and one time span has passed (i.e., the locked time now falls within the second time span), the partial password length may be three. In some implementations, the computing system may be unlocked when a last character of the required password to unlock the computing system is entered.

Figure 7:
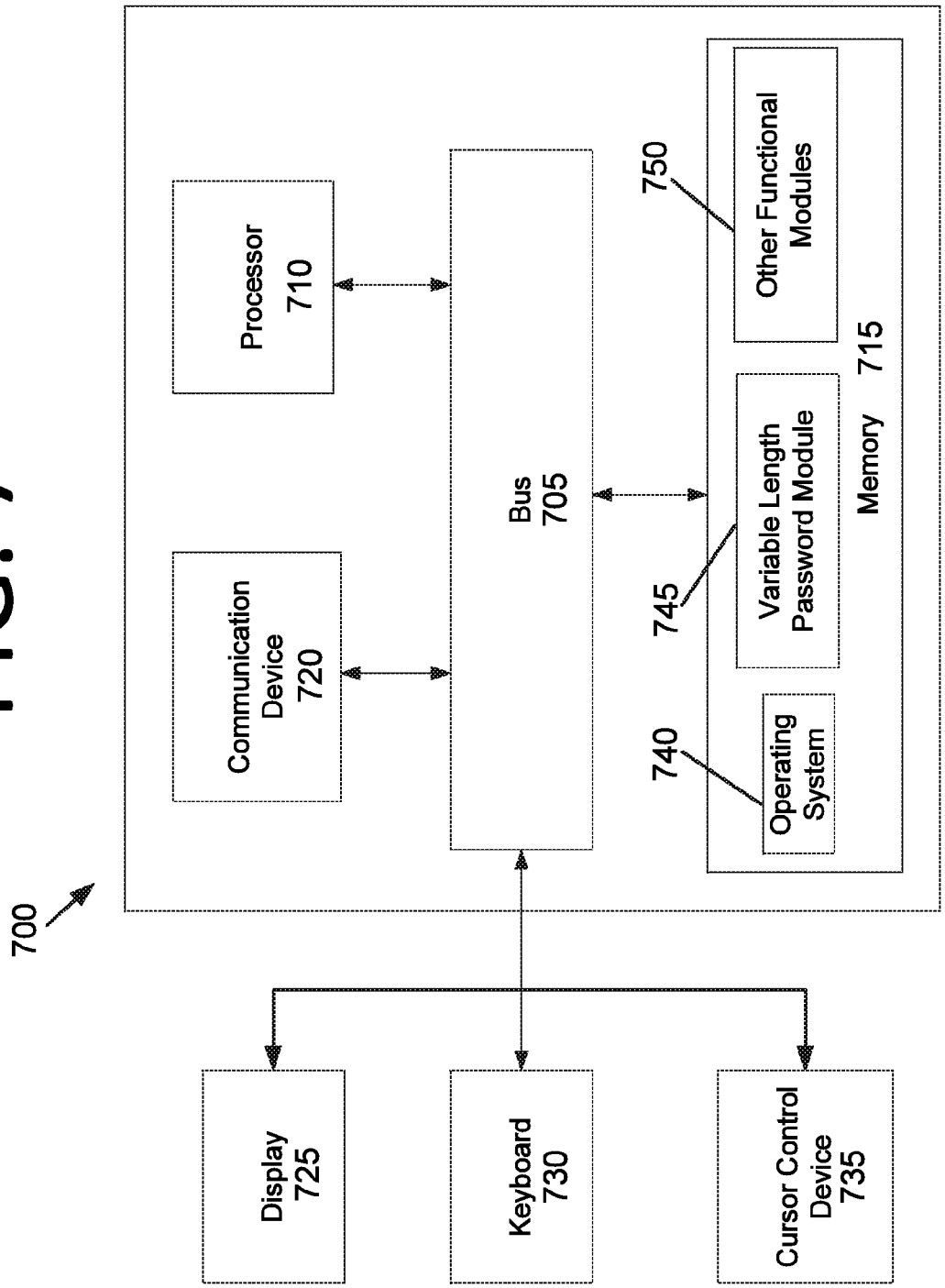
FIG. 7 illustrates a computing system including a variable-length password scheme, according to an implementation of the present disclosure.

FIG. 7 illustrates a computing system including a variable-length password scheme, according to an implementation of the present disclosure. System 700 includes a bus 705 or other communication mechanism for communicating information, and a processor 710 coupled to bus 705 for processing information. Processor 710 may be any type of general or specific purpose processor, including a central processing unit (CPU) or application specific integrated circuit (ASIC). System 700 further includes a memory 715 for storing information and instructions to be executed by processor 710. Memory 715 can be comprised of any combination of random access memory (RAM), read only memory (ROM), flash memory, cache, static storage such as a magnetic or optical disk, or any other types of non-transitory computer-readable media or combinations thereof. Additionally, system 700 includes a communication device 720, such as a wireless network interface card, to provide access to a network.

Non-transitory computer-readable media may be any available media that can be accessed by processor 710 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor 710 is further coupled via bus 705 to a display 725, such as a Liquid Crystal Display ("LCD"), for displaying information to a user. A keyboard 730 and a cursor control device 735, such as a computer mouse, are further coupled to bus 705 to enable a user to interface with system 700. However, in certain implementations such as those for mobile computing, a physical keyboard and mouse may not be present, and the user may interact with the device solely through display 725 and/or a touchpad (not shown). Any type and combination of input devices may be used as a matter of design choice.

In one implementation, memory 715 stores software modules that provide functionality when executed by processor 710. The modules include an operating system 740 for system 700. The modules further include a variable length password module 745 that is configured to require passwords of different lengths under certain conditions. System 700 may include one or more additional functional modules 750 that include additional functionality.

One skilled in the art will appreciate that a "system" could be implemented as a personal computer, a server, a console, a personal digital assistant (PDA), a cell phone, a tablet computing device, or any other suitable computing device, or combination of devices. Presenting the above-described functions as being performed by a "system" is not intended to limit the scope of the present disclosure in any way, but is intended to provide one example of many implementations of the present disclosure. Indeed, apparatuses, processes, and computer programs disclosed herein may be implemented in localized and distributed forms consistent with computing technology, including cloud computing systems.

It should be noted that some of the system features described in this disclosure have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations which, when joined logically together, include the module and achieve the stated purpose for the module. Further, modules may be stored on a computer-readable storage medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

FIG. 8 illustrates a telecommunications system 800, in accordance with an implementation of the present disclosure. Telecommunications system 800 may be any telecommunications system, such as those of any currently available commercial carrier or combination of carriers, may utilize any suitable standards and technologies, such as enhanced Node Bs, RNCs, 3G, 4G, etc., and may include LAN components in at least some implementations. Telecommunications system 800 includes a mobile or cell phone 810, which may be mobile computing devices 200 or 300 of FIGS. 2 through 3B or computing system 700 of FIG. 7 in some implementations. Cell phone 810 wirelessly communicates with a base transceiver station (BTS) 820 that transmits data to, and receives data from, cell phone 810. BTS 820, in turn, communicates with the remainder of the telecommunications network 830, which may be of any desired architecture. For the sake of convenience, the remainder of the telecommunications network is abstracted here, but may have any desired architecture, as would be understood by one of ordinary skill in the art. Within telecommunications network 830 is a server 840 that stores and/or manages security applications for cell phone 810.

In some implementations, cell phone 810 may store multiple authentication schemes and may receive from server 840 an indication of which authentication scheme to use. In other implementations, server 840 may push authentication schemes to cell phone 810. In still other implementations, a user may select the desired security scheme and download it from server 840.

Some implementations of the present disclosure provide a variable length security scheme for unlocking a computing system, or device, that is based on elapsed time in the locked state, a number of partial password unlocks, or both. The length of the required password may progressively increase based on progressive time spans within which the time in the locked state falls, until a full password is required. Through such implementations, users may more conveniently unlock their computing systems when they are frequently accessing the systems. Such implementations may be particularly beneficial for frequent texting, checking of sports scores, checking of calendar applications, and/or for any other case of frequent use.

The process steps performed in FIGS. 4-6 may be performed by a computer program, encoding instructions for the nonlinear adaptive processor to perform at least the processes described in FIGS. 4-6, in accordance with an implementation of the present disclosure. The computer program may be embodied on a non-transitory computer-readable storage medium. The computer-readable storage medium may be, but is not limited to, a hard disk drive, a flash device, a random access memory, a tape, or any other such medium used to store data. The computer program may include encoded instructions for controlling the nonlinear adaptive processor to implement the processes described in FIGS. 4-6, which may also be stored on the computer-readable storage medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

It will be readily understood that the components of various implementations of the present disclosure, as generally described and illustrated in the figures herein, may be arranged and designed in a wide variety of different configurations. Thus, the detailed description of the implementations of the apparatuses, processes, and computer programs of the present disclosure, as represented in the attached figures, is not intended to limit the scope of the apparatuses, processes, and computer programs as claimed, but is merely representative of selected implementations thereof.

The features, structures, or characteristics of the apparatuses, processes, and computer programs described throughout this disclosure may be combined in any suitable manner in one or more implementations. For example, reference throughout this disclosure to "certain implementations," "some implementations," or similar language means that a particular feature, structure, or characteristic described in connection with the implementation is included in at least one implementation of the present disclosure. Thus, appearances of the phrases "in certain implementations," "in some implementations," "in other implementations," or similar language throughout this disclosure do not necessarily all refer to the same group of implementations and the described features, structures, or characteristics may be combined in any suitable manner in one or more implementations.

It should be noted that reference throughout this disclosure to features, advantages, or similar language does not imply that all of the features and advantages that may be realized with the present disclosure should be or are in any single implementation of the disclosure. Rather, language referring to the features and advantages is understood to mean that a specific feature, advantage, or characteristic described in connection with an implementation is included in at least one implementation of the present disclosure. Thus, discussion of the features and advantages, and similar language, throughout this disclosure may, but do not necessarily, refer to the same implementation.

Furthermore, the described features, advantages, and characteristics of the disclosure may be combined in any suitable manner in one or more implementations. One skilled in the relevant art will recognize that the implementations can be practiced without one or more of the specific features or advantages of a particular implementation. In other instances, additional features and advantages may be recognized in certain implementations that may not be present in all implementations of the disclosure.

One having ordinary skill in the art will readily understand that the apparatuses, processes, and computer programs as discussed above may be practiced with steps in a different order, and/or with hardware elements in configurations which are different than those which are disclosed. Therefore, although the apparatuses, processes, and computer programs has been described based upon these implementations, it would be apparent to those of skill in the art that certain modifications, variations, and alternative constructions would be apparent, while remaining within the spirit and scope of the disclosure. In order to determine the metes and bounds of the apparatuses, processes, and computer programs, therefore, reference should be made to the appended claims.

The invention claimed is:

1. A computer-readable device storing a plurality of instructions configured to control a processor to:
   determine a time that a user has been locked out of a computing device;
   determine which of a plurality of time spans that the time falls within, wherein the sum of the plurality of time spans being not more than the number of the characters in a full password of the user multiplied by 60 seconds;
   prompt the user for a required password comprising the full password or a subset of the full password depending on the determined time span that the time falls within; and
   display a visual indicator corresponding to the determined time span or required password length on a visual display, wherein
   a length of the required password for login is progressively longer for each of the plurality of time spans as a time period that a respective time span covers increases.

2. The computer program of claim 1, wherein when the required password comprises a subset of the full password.

3. The computer program of claim 2, wherein the required password comprises a prefix or a suffix of the full password.

4. The computer program of claim 1, wherein a length of the required password is indicated by a clock, a number of character slots, or a number of location indications.

5. The computer program of claim 1, wherein the display comprises a series of location indications, and the required password comprises an ordered plurality of line segments that the user must draw to unlock the computing device.

6. The computer program of claim 1, wherein a visual indicator of the visual display changes when the user has entered a required number of password characters.

7. The computer program of claim 1, wherein a progressively longer subset of the password is required for each successive unlock until the full password is required.

8. The computer program of claim 1, wherein the program is further configured to control the processor to determine a requisite length of the password by applying an algorithm that determines the requisite length by incrementing a length by one character for each time span that has passed, up to a length of the full password, for a length of each time span times the length of the full password.

9. The computer program of claim 1, the program further configured to control the processor to:
   track a number of previous unlocks using a subset of the full password; and
   require the full password once the number of previous unlocks reaches a predetermined number.

10. The computer program of claim 1, wherein the program is further configured to control the processor to:
    unlock the computing device when a last character of the required password is entered.

11. The computer program of claim 1, wherein the program is further configured to control the processor to:
    provide the user with a subset of functionality of the computing device when the computing device is unlocked with less than the full password.

12. A computer-implemented process, comprising:
    determining, by a computing system, a number of times that the computing system has been unlocked using at least one subset of a full password;
    when the number of times is less than a predetermined number, requiring, by the computing system, a subset of the full password to unlock the computing system;
    when the number of times is equal to the predetermined number, requiring, by the computing system, the full password to unlock the computing system;
    receiving, by the computing system, either the subset of the full password or the full password entered by a user, based on a previous determination of the computing system; and
    authenticating the password, by the computing system, to unlock the computing system.

13. The computer-implemented process of claim 12, wherein the at least one subset of the full password comprises a prefix or a suffix of the full password.

14. The computer-implemented process of claim 12, wherein a length of the required password is indicated by a clock, a number of character slots, or a number of location indications.

15. The computer-implemented process of claim 12, wherein a display of the computing system comprises a series of location indications, and a required password comprises an ordered plurality of line segments that the user must draw to unlock the computing system.

16. The computer-implemented process of claim 12, wherein a visual indicator of a visual display of the computing system changes when the user has entered a required number of password characters.

17. The computer-implemented process of claim 12, wherein a progressively longer subset of the password is required for each successive unlock until the full password is required.

18. The computer-implemented process of claim 12, further comprising:
    determining a requisite length of the password by applying an algorithm that determines the requisite length by incrementing a length by one character for each time span of a plurality of time spans that has passed, up to a length of the full password, for a length of each time span times the length of the full password, unless the predetermined number of unlocks has been reached.

19. The computer-implemented process of claim 12, further comprising:
    unlocking the computing system when a last character of the password is entered.

20. The computer-implemented process of claim 12, wherein the full password is required once a predetermined period of time has elapsed, regardless of the number of previous unlocks.

21. The computer-implemented process of claim 12, further comprising:
    providing the user with a subset of functionality of the computing system when the computing system is unlocked with the subset of the full password.

22. An apparatus, comprising:
physical memory comprising computer program instructions; and
at least one processor configured to execute the computer program instructions, the at least one processor configured to:
determine a time that the apparatus has been in a locked state,
determine a requisite length of a required password to unlock the apparatus by dividing the time that the apparatus has been in the locked state by a first predetermined number,
receive a password of the requisite length entered by a user, and
authenticate the password to unlock the apparatus.

23. The apparatus of claim 22, wherein the at least one processor is configured to require a full password when the time in the locked state divided by the first predetermined number exceeds a second predetermined number.

24. The apparatus of claim 22, wherein when the required password comprises a subset of the full password, the required password comprises a prefix or a suffix of the full password.

25. The apparatus of claim 22, further comprising:
a visual display comprising, as a visual indicator, a clock, a number of character slots, or a displayed number indicating the length of the required password.

26. The apparatus of claim 25, wherein the visual indicator of the visual display changes when a password entered by the user reaches the requisite length.

27. The apparatus of claim 22, further comprising:
a visual display comprising a series of location indications, wherein
the required password comprises an ordered plurality of line segments that the user must draw to unlock the apparatus.

28. The apparatus of claim 22, wherein the at least one processor is further configured to:
track a number of previous unlocks using a subset of the full password; and
require the full password once the number of previous unlocks reaches a predetermined number.

29. The apparatus of claim 22, wherein the at least one processor is further configured to:
unlock the apparatus when a last character of the password is entered.

30. The apparatus of claim 22, wherein the at least one processor is further configured to:
provide the user with a subset of functionality of the apparatus when the apparatus is unlocked with less than the full password.

31. An apparatus, comprising:
physical memory comprising computer program instructions; and
at least one processor configured to execute the computer program instructions, the at least one processor configured to:
determine a number of times that the apparatus has been unlocked using a partial password since a last full password unlock,
when the apparatus has been unlocked less than a predetermined number of times using the partial password, prompt the user for the partial password,
when the apparatus has been unlocked the predetermined number of times using the partial password, prompt the user for the full password,
receive a password entered by a user, and
authenticate the password to unlock the apparatus.

32. The apparatus of claim 31, wherein when the apparatus has been unlocked less than the predetermined number of times, the at least one processor is further configured to:
increase a length of the partial password based on the determined number of times that the apparatus has been unlocked using the partial password since the last full password unlock.

33. The apparatus of claim 31, wherein the at least one processor is further configured to:
determine a time that the apparatus has been in a current locked state, and
when the apparatus has been unlocked less than the predetermined number of times, increase a length of the partial password based on a time span in which the time falls.

34. The apparatus of claim 31, wherein when the user enters an incorrect partial password, the at least one processor is further configured to:
determine a number of times that the user has entered an incorrect partial password, and
prompt the user for the full password when the number of times the user has entered an incorrect password reaches a predetermined number.

35. The apparatus of claim 31, wherein the at least one processor is further configured to:
provide the user with a subset of functionality of the apparatus when the apparatus is unlocked with less than the full password.

* * * * *